(12) United States Patent
Lim

(10) Patent No.: US 9,372,847 B2
(45) Date of Patent: Jun. 21, 2016

(54) METHOD, DEVICE AND COMPUTER READABLE RECORDING MEDIUM FOR PREVENTING INPUT ERROR WHEN INFORMATION IS INPUTTED THROUGH TOUCH SCREEN

(75) Inventor: Seung Phill Lim, Yongin-si (KR)

(73) Assignee: NHN Corporation, Seongnam-si (KR)

( * ) Notice: Subject to any disclaimer, the term of this patent is extended or adjusted under 35 U.S.C. 154(b) by 708 days.

(21) Appl. No.: 12/631,482

(22) Filed: Dec. 4, 2009

(65) Prior Publication Data

US 2010/0141597 A1 Jun. 10, 2010

(30) Foreign Application Priority Data

Dec. 5, 2008 (KR) .................. 10-2008-0123613

(51) Int. Cl.
*G06F 3/041* (2006.01)
*G06F 17/27* (2006.01)
*G06F 3/0488* (2013.01)

(52) U.S. Cl.
CPC .......... *G06F 17/274* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 6,223,059 B1 * | 4/2001 | Haestrup | ............... | G06F 3/0237 345/172 |
| 2006/0062461 A1 * | 3/2006 | Longe | ..................... | G06F 3/018 382/185 |
| 2006/0274051 A1 * | 12/2006 | Longe | .................. | G06F 3/0237 345/173 |
| 2007/0040813 A1 * | 2/2007 | Kushler et al. | ................ | 345/173 |
| 2007/0070045 A1 * | 3/2007 | Sung | ..................... | G06K 9/222 345/173 |
| 2008/0189605 A1 * | 8/2008 | Kay | ...................... | G06F 3/0237 715/257 |
| 2009/0058814 A1 * | 3/2009 | Rubanovich | .......... | G06F 3/0236 345/169 |
| 2009/0102805 A1 * | 4/2009 | Meijer | .................... | G06F 3/016 345/173 |

FOREIGN PATENT DOCUMENTS

| | | |
|---|---|---|
| JP | 2-46239 | 3/1990 |
| JP | 4-333912 | 11/1992 |
| JP | 6-19600 | 1/1994 |

\* cited by examiner

*Primary Examiner* — Joseph Haley
*Assistant Examiner* — Ifedayo Iluyomade
(74) *Attorney, Agent, or Firm* — Harness, Dickey & Pierce, P.L.C.

(57) ABSTRACT

Disclosed are a method, device and computer readable recording medium for preventing an input error when information is inputted through a touch screen. According to an exemplary embodiment of the present invention, there is provided a method for preventing an input error when information is inputted through a touch screen, including the steps of sensing a start and a finish of a touch on the touch screen and acquiring input data corresponding to a point where the touch is finished when the finish of the touch is sensed, and performing a grammar check on the acquired input data and displaying the input data if the input data is determined to be grammatically correct.

17 Claims, 2 Drawing Sheets

METHOD, DEVICE AND COMPUTER READABLE RECORDING MEDIUM FOR PREVENTING INPUT ERROR WHEN INFORMATION IS INPUTTED THROUGH TOUCH SCREEN

CROSS REFERENCE TO RELATED APPLICATION

This application claims priority from and the benefit of Korean Patent Application No. 10-2008-0123613, filed on Dec. 5, 2008, which is hereby incorporated by reference for all purposes as if fully set forth herein.

BACKGROUND OF THE INVENTION

1. Field of the Invention

Exemplary embodiments of the present invention relate to a method, device and computer readable recording medium for preventing an input error when information is inputted through a touch screen, and more specifically, to a method, device and computer readable recording medium, in which data input is accomplished when a touch on the touch screen is finished not when the touch starts, so that desired data can be inputted without an error only when a user finishes the touch at a correct point, and at the same time, a grammar check is performed on the inputted character information and thus only grammatically correct data are displayed as correct input data, thereby preventing incorrect input of the user.

2. Discussion of the Background

In accordance with the trends of miniaturizing mobile terminals and implementing user-oriented interfaces, input interface techniques using a touch screen are widely used.

Generally, a touch screen is an apparatus in which a touch panel capable of sensing a user's touch is included in a display such as a liquid crystal display (LCD) so that a user may perform a desired operation. Since such a touch screen allows a user to perform a desired operation without an additional input means such as a keyboard or the like, it is widely used in small-sized terminals (e.g., a cellular phone, an MP3 player, a navigator) that are limited in space compared with other apparatus.

In general, a terminal provided with a touch screen includes a monitor as a display unit, a touch panel attached to the monitor, a control unit for controlling a variety of application programs installed in the terminal according to a signal sensed in the touch panel, and one or more devices for performing various operations under the control of the control unit. Here, specifically, the touch panel is configured to have several layers including specially processed electrode glass (ITO glass) and electrode film (ITO film) and recognizes a touch point as a coordinate value when a hand, a pen, or the like touches the surface of the touch panel. The control unit receives a position signal corresponding to the recognized coordinate value and controls the devices to process a corresponding function.

In keeping with the trends of miniaturizing terminals, a display unit included in a is terminal may be limited in size. Accordingly, an area occupied by an input interface that can be displayed on the touch screen is also reduced. Therefore, if a user does not use a pointed tool (e.g., a stylus pen) when he or she inputs desired information through the input interface displayed on the touch screen, input errors may frequently occur. For example, when the user inputs character information using a keyboard displayed on the touch screen, an input error may occur by touching a key neighboring a desired key by mistake. If such an input error occurs, the user suffers from the inconvenience of deleting the character information inputted by the user and re-inputting correct character information.

Thus, it is beneficial to develop a technique for minimizing user's input errors when a user inputs information through a terminal having a touch screen.

SUMMARY OF THE INVENTION

Exemplary embodiments of the present invention provide a solution to the aforementioned problems.

Exemplary embodiments of the present invention also provide a technique to input data corresponding to a point where a touch is finished when information is inputted through a touch screen so that a user may input correct data by continuously changing a touch point although the user incorrectly touches the touch screen regardless of user's intention.

Exemplary embodiments of the present invention also provide a technique to prevent a user's input error by determining whether an input is grammatically correct although the inputted data corresponds to a point where a touch is finished and displaying only grammatically correct data when the user inputs information through a touch screen.

Additional features of the invention will be set forth in the description which follows, and in part will be apparent from the description, or may be learned by practice of the invention.

An exemplary embodiment of the present invention discloses a method for preventing an input error when information is inputted through a touch screen, including sensing a start of a touch and a finish of the touch on the touch screen, acquiring input data corresponding to a point where the touch is finished in response to sensing the finish of the touch, performing a grammar check on the acquired input data, and displaying the input data if the input data is determined to be grammatically correct.

An exemplary embodiment of the present invention also discloses a device for preventing an input error when information is inputted through a touch screen, including a touch sensing unit to sense a start of a touch and a finish of the touch on the touch screen, an input data acquisition unit to acquire input data corresponding to a point where the touch is finished, in response to sensing of the finish of the touch by the touch sensing unit, and a grammar checking s unit to perform a grammar check on the acquired input data, wherein the input data is displayed on the touch screen if the input data is determined to be grammatically correct.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to is explain the principles of the invention.

DETAILED DESCRIPTION OF THE ILLUSTRATED EMBODIMENTS

Figure 1:
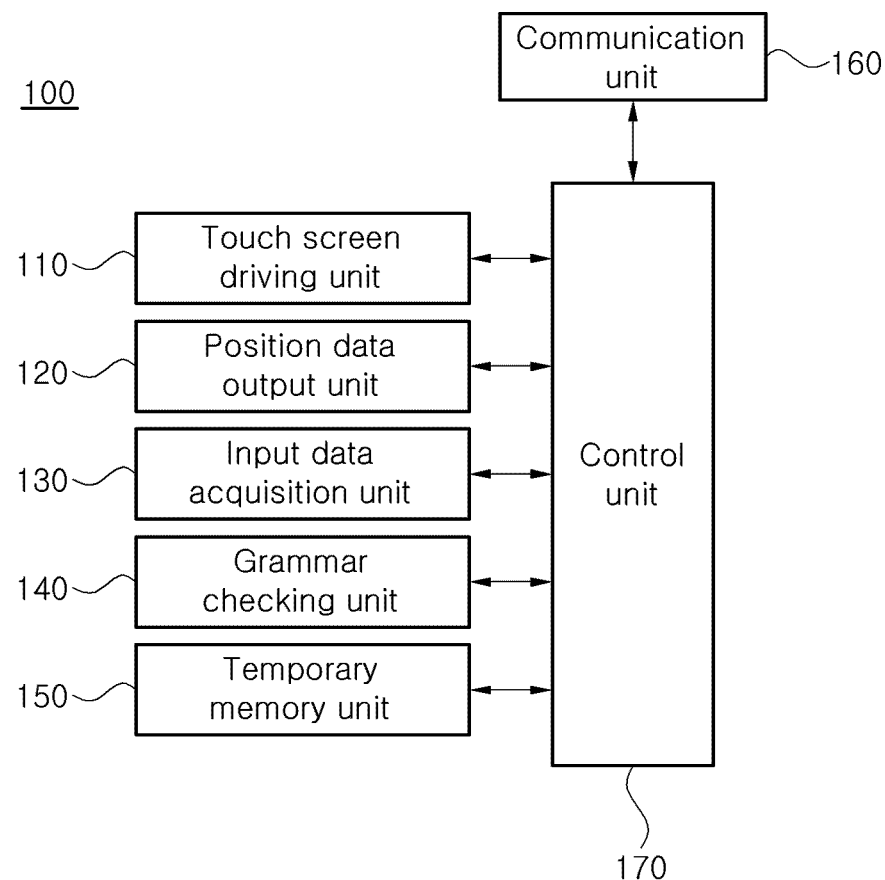
FIG. 1 is a view showing the configuration of a terminal for preventing an input error when information is inputted through a touch screen according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It is to be understood that the various exemplary embodiments of the invention, although different from each other, are not necessarily mutually exclusive. For example, specific configurations, structures, and features described herein, in connection with one exemplary embodiment, may be implemented within other embodiments without departing from the spirit and scope of the invention. In addition, it is to be understood that the location or arrangement of individual elements within each exemplary embodiment may be modified without departing from the spirit and scope of the invention. The following detailed description is, therefore, not to be taken for the purpose of limitation, and the scope of the present invention is defined only by the appended claims, appropriately interpreted, along with the full range of equivalents to which the claims are entitled.

In the specification and claims, the term 'terminal' means a digital device capable of wired and wireless communication. This refers to a digital device, which is installed with a memory means and a microprocessor and has an operating ability, such as a personal computer (e.g., a desktop computer, a notebook computer, or the like), workstation, PDA, web pad, cellular phone, navigator, and the like. Particularly, although a digital device having a touch screen is described as an example, it should be understood that that the present invention is not necessarily limited thereto. For example, exemplary embodiments of the present invention may be used in any device having a touch screen or similar input.

FIG. 1 is a view showing the configuration of a terminal for preventing an input error when information is inputted through a touch screen according to an exemplary embodiment of the present invention.

As shown in FIG. 1, a terminal 100 of an exemplary embodiment of the present invention may include a touch screen driving unit 110, a position data output unit 120, an input data acquisition unit 130, a grammar checking unit 140, a temporary memory unit 150, a communication unit 160, and a control unit 170. According to an exemplary embodiment of the present invention, the touch screen driving unit 110, the position data output unit 120, the input data acquisition unit 130, the grammar checking unit 140, the temporary memory unit 150, the communication unit 160, and the control unit 170 may be program modules provided in the terminal 100. Such program modules may be installed in the terminal 100 in the form of an operating system, an application program module, or other program modules, and may be physically stored in a variety of commonly known memory devices. In addition, such program modules may be stored in a remote memory device that can communicate with the terminal 100.

Although such program modules may include routines, subroutines, programs, objects, components, data structures and the like for performing a specific task described below or executing a specific abstract data type, they are not limited thereto.

The touch screen driving unit 110 according to an exemplary embodiment of the present invention will be described with reference to FIG. 2. The touch screen driving unit 110 operates a touch screen of the terminal 100 and generates an electrical signal corresponding to a touch when the touch is sensed on the touch screen.

Figure 2:
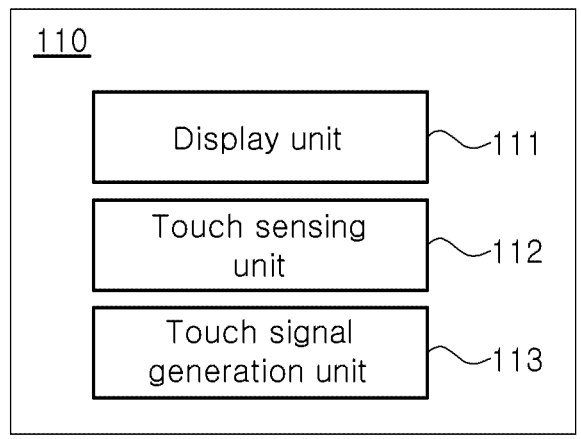
FIG. 2 is a view showing the detailed internal configuration of a touch screen driving unit 110 according to an exemplary embodiment of the present invention.

Referring to FIG. 2, the touch screen driving unit 110 may include a display unit 111, a touch sensing unit 112, and a touch signal generation unit 113.

The display unit 111 may display at least state information generated while the terminal 100 is operating, multimedia information, and/or key buttons. The display unit 111 may be for example, liquid crystal display (LCD), or an organic electroluminescent display.

The touch sensing unit 112 may sense a touch when the touch is generated on a key button or the like of the display unit 111 by an implement (e.g., a stylus pen, a user's finger, or the like). The touch sensing unit 112 according to an exemplary embodiment of the present invention senses at least a moment when a touch starts and a moment when the touch finishes.

If the moment when a touch starts is sensed, the touch sensing unit 112 may transfer a corresponding sensing signal to the control unit 170, and the control unit 170 drives the display unit 111 to display a point on the touch screen where the touch starts. The point where the touch starts may be displayed by enlarging a corresponding point, changing the color of the point, or the like. For example, when a keyboard capable of inputting character information is displayed on the display unit 111 and a user touches an implement to a specific key on the display, it is possible to enlarge the key or change the color of the key on the display. As another example, when geographical information is displayed on the display unit 111 and the user selects a specific point on the display, it is possible to enlarge the corresponding point or change the color of the point. In addition, the control unit 170 may output a sound effect or the like in response to a touch on a corresponding key by driving a sound codec or a speaker (not shown) provided in the terminal 100.

In addition, in the case where a touch starts and is then moved continuously on the touch screen, the touch sensing unit 112 may monitor the movement of the touch and transfer a corresponding sensing signal to the control unit 170, and the control unit 170 may drive the display unit to display a point on the touch screen corresponding to the presently touched point by, for example, enlarging a corresponding point, changing the color of the point, or the like.

In response to sensing the moment when the touch is finished, the touch sensing unit 112 may transfer a corresponding sensing signal to the control unit 170, thereby making it possible for the control unit 170 to generate an electrical signal corresponding to the touch by driving the touch signal generation unit 113. That is, the touch signal generation unit 113 according to an exemplary embodiment of the present invention may generate an electrical signal corresponding to a touch sensed by the touch sensing unit 112 when the touch is finished, not when the touch starts, thereby allowing a practical information input process to progress.

In this manner, although an unwanted point is touched when a user inputs information using the touch screen, the user may continuously move the touch point to correctly specify a finishing point of the touch, thereby inputting desired information.

The position data output unit 120 according to an exemplary embodiment of the present invention analyzes the electrical signal generated by the touch signal generation unit 113 and outputs position data corresponding to the touch point. Although the position data may be expressed as coordinate value information corresponding to the touch point, the present invention is not limited thereto.

The input data acquisition unit 130 according to an exemplary embodiment of the present invention acquires corresponding input data with reference to the position data outputted by the position data output unit 120.

The grammar checking unit 140 according to an exemplary embodiment of the present invention performs a grammar check on the input data acquired by the input data acquisition unit 130 and stores only grammatically correct input data into the temporary memory unit 150. The grammar mentioned herein may include grammar for any language, including, for example, Korean, English, or Japanese. In an exemplary embodiment of the present invention, if the previous input data is a Korean initial consonant, a Korean medial vowel should follow as the next input data. However, if a Korean consonant is acquired as the next input data, this may be determined to be grammatically incorrect. In addition, in a state where Korean initial consonant and medial vowel are consecutively obtained as previous input data, if a consonant acquired as the next input data is a consonant unsuitable for a final consonant, or a consonant successively obtained as the next input data is a consonant unsuitable for Korean spelling rules although the consonant acquired as the next input data is suitable for a final consonant, this may be determined to be grammatically incorrect. In addition, although a consonant unsuitable for a final consonant (e.g., 'ㄸ') is acquired as the next input data after an input data is acquired as a medial vowel, since the consonant may be an input data suitable for an initial consonant of the is next character, a grammar check may be performed with reference to the next input data in this case. For example, if a successively acquired input data is a vowel that can function as a medial vowel, the input of the consonant ('ㄸ') may be determined to be grammatically correct. In order to perform the aforementioned process, the grammar checking unit 140 may refer to a database (not shown) that stores information on words or expressions including a set of Korean consonants and vowels. In another exemplary embodiment of the present invention, if previous input data are English letters, the grammar checking unit 140 may perform a grammar check on the English letters. In still another exemplary embodiment of the present invention, if previous input data are Japanese characters, the grammar checking unit 140 may perform a grammar check on the Japanese characters. The grammar check on Korean, English, and Japanese input is merely an example for explaining the present invention; a grammar check may be performed on any other language.

In response to input of grammatically incorrect information by a user, i.e., information different from the information desired by the user, the grammar checking unit 140 may cause corresponding information not to be outputted by storing only grammatically correct input data in the temporary memory unit 150 through the process described above. Accordingly, the user may be relieved from the inconvenience of deleting the data previously inputted by touching the touch screen, which may be difficult to control, when incorrect data are inputted. Additionally, in response to input of grammatically incorrect information by a user, the control unit 170 may cause a signal to be outputted to the user to alert him or her as to the incorrect input. The signal may be, for example, a sound outputted by a speaker (not shown) or an alert displayed on the display unit 111.

The temporary memory unit 150 according to an exemplary embodiment of the present invention temporarily stores data generated while the terminal 100 operates, and particularly, input data that is determined by the grammar checking unit 140 to be grammatically correct. The input data temporarily stored in the temporary memory unit 150 may be displayed on the display unit 111 in the form of a grapheme, a morpheme, a syllable, a word, an expression, or the like. Such a temporary memory unit 150 may be data memory and may be implemented as random access memory (RAM) or the like.

The communication unit 160 according to an exemplary embodiment of the present invention performs wired or wireless communications with an external apparatus based on previously defined communication standards. Although such a communication unit 160 may be a wireless communication module such as a radio frequency (RF) module or the like, it is not limited thereto.

The control unit 170 according to an exemplary embodiment of the present invention may control data flow among the touch screen driving unit 110, the position data output unit 120, the input data acquisition unit 130, the grammar checking unit 140, the temporary memory unit 150, and the communication unit 160. That is, the control unit 170 may control the touch screen driving unit 110, the position data output unit 120, the input data acquisition unit 130, the grammar checking unit 140, the temporary memory unit 150, and the communication unit 160 to perform their respective functions.

Hereinafter, an example of inputting Korean character information through a touch screen of the terminal 100 according to an exemplary embodiment of the present invention will be described.

FIG. 3 is a view showing an example of a keypad displayed on the display unit 111 of the terminal 100 having a touch screen according to an exemplary embodiment of the present invention.

Figure 3A:
FIG. 3a, FIG. 3b, and FIG. 3c are views showing an example of driving a touch screen installed in a terminal according to an exemplary embodiment of the present invention.
Figure 3B:
Figure 3C:

A user may input Korean character information using the keypad 310 as shown in FIG. 3a, FIG. 3b, and FIG. 3c. A display window 320 for displaying data inputted up to the present by the user may be provided above the keypad 310.

The example will be described assuming that a user performs the operation of finishing a touch at a point where consonant 'ㅎ' is placed on the keypad 310 in a state where a character of '사' has been inputted by inputting consonant 'ㅅ' and vowel 'ㅏ'.

Specifically, if the user starts to touch the point of 'ㅎ' an indication is displayed to inform the user that a corresponding key is selected. For example, as shown in FIG. 3a, the color of the key corresponding to 'ㅎ' may be changed.

If the touch point of the user is changed and continuously moved to a point where consonant 'ㅍ' is placed, the color of the key 'ㅍ' is changed to inform the user of the selection of the key as shown in FIG. 3b.

However, if the user determines that consonant 'ㅍ' is incorrectly pressed, continuously moves the touch to the point where consonant 'ㅎ' is placed, and finishes the touch after returning to the state as shown in FIG. 3a, an electrical signal is generated corresponding to the point where consonant 'ㅎ' is placed, i.e., the point where the touch is finished, and thus, the input data acquisition unit 130 may acquire input data 'ㅎ'.

At this point, the grammar checking unit 140 may perform a grammar check. That is, the grammar checking unit 140 may check whether consonant 'ㅎ' which is the input data acquired after '사' is a proper input. Here, although consonant 'ㅎ' is unsuitable for a final consonant of character '사' consonant 'ㅎ' may be suitable for an initial consonant of the next syllable. Therefore, whether consonant 'ㅎ' is used as a final consonant of '사' or as an initial consonant of the next syllable can be determined after the next input data is additionally acquired. In the former case, consonant 'ㅎ' is determined as an improper input, and corresponding input data is not stored in the temporary memory unit 150. Accordingly, as shown in FIG. 3a, input of consonant 'ㅎ' may not be displayed on the display window 320.

Since the terminal operates as described above, the user may input information as intended by correctly specifying a point where the touch is finally finished even when the user incorrectly touches the touch screen, and only correctly inputted data is outputted through a grammar check performed on the data inputted as intended by the user.

The aforementioned exemplary embodiments of the present invention may be implemented in the form of a program command that may be executed through a variety of components of a computer and recorded in a computer readable medium. The computer readable medium may store program commands, data files, data structures, and the like in an independent or combined form. The program command recorded in the computer readable medium may be a command specially designed and constructed for the present invention or a command publicized to and used by those skilled in a computer software field. The computer readable medium may include, for example, magnetic media such as a hard disk, a floppy disk and a magnetic tape, optical recording media such as CD-ROM and DVD, magneto-optical media such as a floptical disk, and a hardware device specially constructed to store and execute a program command, such as ROM, RAM, flash memory, and the like. The program command may include, for example, high-level language codes that can be executed by a computer using an interpreter or the like, as well as machine language codes created by a compiler. The hardware device may be constructed to operate as one or more software modules in order to perform the processing according to the present invention, and vice versa.

As described above, according to exemplary embodiments of the present invention, it is possible to input correct data through a touch screen if a user touches a correct point at the final point of a touch even though the user initially touched an incorrect point on the touch screen, whereby the possibility of inputting incorrect data is lowered.

In addition, according to exemplary embodiments of the present invention, since corresponding data is displayed only when grammatically correct character data is inputted, a user can be relieved of the inconvenience of deleting corresponding data manually when the user inputs grammatically incorrect data.

Although the present invention has been described with reference to the limited exemplary embodiments and accompanying drawings, they are provided only for the purpose of understanding the present invention and the present invention is not limited to the exemplary embodiments.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for preventing an input error associated with a touch screen, the method comprising:
    detecting, using at least one processor, an input character during a start of an input and a finish of the input associated with the touch screen;
    determining, using the at least one processor, whether the detected input character at the finish of the input is correct by performing a grammar check or spell check;
    displaying, using the at least one processor, the detected input character on the touch screen when the detected input character is determined to be correct based on the performed grammar check or spell check; and
    prohibiting, using the at least one processor display of the detected input character on the touch screen when the detected input character is determined not to be correct based on the performed grammar check or spell check,
    the detected input character is generated by a sequential path of touch, the sequential path of touch being a single continuous touch from the start of the input to the finish of the input, and
    the detected input character is determined to be data of only a key that corresponds to an end of the sequential path of touch.

2. The method of claim 1, further comprising: providing, using the at least one processor, an indication indicating a presently touched point during the start of the input and the finish of the input.

3. The method of claim 2, wherein the indication comprises at least one of enlarging the presently touched point, changing a color of the presently touched point, and outputting a sound.

4. The method of claim 1, further comprising:
    generating, using the at least one processor, an electrical signal at a point corresponding to the finish of an input;
    outputting, using the at least one processor, position data corresponding to the electrical signal; and
    generating, using the at least one processor, input character corresponding to the position data.

5. The method of claim 4, wherein the position data is generated in the form of a coordinate value.

6. The method of claim 1, wherein the grammar check or spell check is performed using English grammar rules and spelling rules.

7. The method of claim 1, further comprising:
    outputting, using the at least one processor, an alert signal if the detected input character is determined to be grammatically incorrect.

8. A device for preventing an input error associated with a touch screen, the device comprising:
    a touch screen;
    a memory having computer readable instructions stored thereon; and
    at least one processor configured to execute the computer readable instructions to,
        detect an input character during a start of an input and a finish of the input associated with the touch screen;
        retrieve the input character corresponding to the start of the input associated with a touch event; and
        determine whether the retrieved input character at the finish of the input is correct by performing a grammar check or spell check, cause the input character to be displayed on the touch screen when the detected input character is determined to be correct based on the performed grammar check or spell check, and prohibit the input character from being displayed on the touch screen when the detected input character is determined not to be correct based on the performed grammar check or spell check, the detected input character is generated by a sequential path of touch, the sequential path of touch being a single continuous touch from the start of the input to the finish of the input, and the detected input character is determined to be data of only a key that corresponds to an end of the sequential path of touch.

9. The device of claim 8, wherein the at least one processor is further configured to:

generate an electrical signal at a finish of an input in response to detection of a touch event; and receive the generated electrical signal and output position data corresponding to the electrical signal, wherein the input character is generated corresponding to the position data.

10. The device of claim 8, wherein the at least one processor is further configured to provide an indication indicating a presently touched point during the start of the input and the finish of the input.

11. The device of claim 10, wherein the indication comprises at least one of enlarging the presently touched point, changing a color of the presently touched point, and outputting a sound.

12. The device of claim 9, wherein the position data is expressed in the form of a coordinate value.

13. The device of claim 8, wherein the at least one processor is further configured to perform the grammar check or spell check by determining whether the input character conforms to English grammar rules and spelling rules.

14. The device of claim 8, wherein an alert signal is caused to be outputted if the detected input character is determined to be grammatically incorrect.

15. A non-transitory computer-readable recording medium comprising an executable program which, when executed by at least one processor, configures the at least one processor to detect an input character during a start of an input and a finish of the input associated with the touch screen;

determine whether the detected input character at the finish of the input is correct by performing a grammar check or spell check;

display the detected input character on the touch screen when the detected input character is determined to be correct based on the performed grammar check or spell check; and prohibit display of the detected input character on the touch screen when the detected input character being determined not to be correct based on the performed grammar check or spell check, the detected input character is generated by a sequential path of touch, the sequential path of touch being a single continuous touch from the start of the input to the finish of the input, and the detected input character is determined to be data of only a key that corresponds to an end of the sequential path of touch.

16. An apparatus, comprising:

at least one processor configured to, detect input character during a start of an input and a finish of the input associated with a touch screen and to determine whether the detected input character at the finish of the input is correct based on a performed a grammar check or spell check, cause display of the detected input character on the touch screen when the detected input character being determined to be correct based on the performed grammar check or spell check, and not cause display of the detected input character on the touch screen when the detected input character being determined not to be correct based on the performed grammar check or spell check, the detected input character is generated by a sequential path of touch, the sequential path of touch being a single continuous touch from the start of the input to the finish of the input, and the detected input character is determined to be data of only a key that corresponds to an end of the sequential path of touch.

17. The method of claim 1, further comprising:

storing, using the at least one processor, the detected input character in a memory in response to the detected input character being determined to be correct based on the performed grammar check or spell check; and not storing, using the at least one processor, the detected input character in the memory in response to the detected input character being determined not to be correct.

* * * * *